3,337,352
ANTIFOULING PAINT COMPOSITION
Ryuichi Sano, Higashimachi, and Kameo Machihara, Amagasaki-shi, Hyogo-ken, Japan, assignors to Kansai Paint Company, Limited, Hyogo-ken, Japan, a corporation of Japan
No Drawing. Filed June 29, 1964, Ser. No. 378,991
9 Claims. (Cl. 106—15)

ABSTRACT OF THE DISCLOSURE

Antifouling paint compositions are provided which prevent the fouling of metal, concrete, wood and other surfaces which are in contact with sea water. The compositions comprise a paint suitable for application to metal, concrete, wood and other substrates which have incorporated therein an effective amount of an antifouling compound of the formula

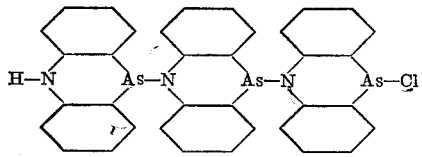

The method for using the antifouling compositions is also provided.

---

This invention relates to antifouling paint compositions and the method of using them.

The primary object of this invention is to provide antifouling paint compositions, the film of which retains antifouling properties which prevents adherence thereto of fouling organisms present in water.

Another object of this invention is to provide antifouling paint compositions which do not deteriorate or lose their antifouling properties even in polluted water, e.g. water containing hydrogen sulfide.

A further object of this invention is to provide antifouling paint compositions which do not accelerate the corrosion of the substrates to which it is applied such as metal, concrete, wood and the like.

A further object of this invention is to provide antifouling paint compositions which can be stored for long periods of time without precipitation and decomposition.

An additional object of this invention is to provide antifouling paint compositions which are substantially nontoxic to the human body.

An additional object of the instant invention is the provision of a method of using these compositions.

The antifouling paint compositions of this invention comprises as the antifouling constituent thereof tri-phenarsazine chloride having the structural formula:

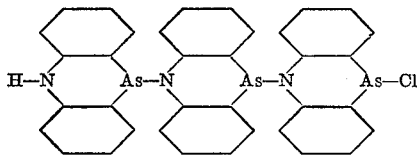

M.P. 260–263° C., Wieland, Rheinheimer, Lieb, Ann. 423, 14 (1921).

Tri-phenarsazine chloride can be obtained by heating adamsite (10-chloro-5,10-dihydrophenarsazine) in pyridine, and it can also be obtained by adding water to an equal amount of acetone or alcoholic solution of adamsite or by passing hydrogen chloride through hot pyridine solution of phenarsazine oxide. It may also be prepared by dissolving adamsite and phenarsazine oxide in equal mole amounts in nitrobenzene and inducing reaction of heating. Khadzhizhehev, M.I. Compt. Rend. Acad. Bulgare Sci. 10, No. 1, 57–60 (1957). The product thus obtained can be purified through recrystallization from pyridine containing hydrogen chloride. Those of low purity can also be obtained by adding water to adamsite powder and separating the obtained powder after reaction in the acidic range of pH 0.5 to 7.0.

As antifouling toxic compounds of the phenarsazine type, phenarsazine chloride (adamsite), phenarsazine fluoride, etc. are known. See for example U.S. Patent No. 3,041,188, issued June 26, 1962, and British Patent No. 861,500, issued Oct. 5, 1959. However, tri-phenarsazine chloride employed in the instant invention has been unknown prior to the instant invention. It has been confirmed by conductive water immersion tests in Shimizu Port, Yokohama Port, River Uji, etc. that the antifouling paint compositions comprising tri-phenarsazine chloride possess superior antifouling properties against the fouling organisms in sea water as well as macronema or hydropsyche, etc. found in fresh water.

Antifouling paint compositions comprising cuprous and mercuric constituents have generally been used due to their fairly effective antifouling properties. However, such paints cause the so-called "blackening" in polluted water containing hydrogen sulfide. This is due to the easily soluble metal oxides being transformed into the insoluble black sulfides. This causes loss of the antifouling power entirely and at the same time accelerates the electrochemical activity causing corrosion of steel and other metal plates under the blackened film. It has also been recognized that when such paints are applied to light alloys, even in water containing no hydrogen sulfide, the copper, mercury or other metal is deposited over the metal substrate and the galvanic corrosion is accelerated. On the other hand, the paints comprising adamsite, the representative organic antifouling toxic constituent, are free from the foregoing defects, but they are lower in durability than those containing cuprous and mercuric compounds. This causes the film to easily lose its strength and adhesive power owing to blistering and softening. Additionally they are further defective in that the violent irritative odor restricts the conditions of manufacture and application.

The paint of the instant invention is free from any of the foregoing defects of the adamsite type or cuprous and mercuric type.

Therefore, the first feature of the antifouling paint compositions of this invention is that they have high durability of antifouling properties and they ensure the durability of the film strength. In the paints of adamsite type, hydrochloric acid is liberated in the film under water, causing blisters and softening and lowering the strength and adhesive power of the film. At the same time, the toxic antifouling constituent in the film is dissolved and wasted within a short time after immersion. Thus the effective antifouling period is shortened.

In the paint composition of the instant invention, tri-phenarsazine chloride is far more stable than adamsite in the film under water. No blistering or softening is caused and the compositions maintain superior antifouling properties over a long period of time.

The second feature is that the paint compositions of the instant invention do not change their properties in sea water containing hydrogen sulfide. No change is recognized in its antifouling effectiveness, and there is no acceleration of the corrosion of the metal substrate.

As is apparent from its composition, neither does it accelerate the corrosion of the light alloys.

These properties are considered especially advantageous when compared with paints containing cuprous and mercuric compounds.

The third feature is that the paint composition containing tri-phenarsazine chloride are much less irritative in odor than those of the adamsite type. While adamsite severely irritates nostrils because of the liberated hydrochloric acid, and the paints in which adamsite is comprised often cause difficulties in manufacturing and application, tri-phenarsazine chloride contained in the paint compositions of this invention has a much less irritative odor. This makes easy the manufacture and application of the compositions and substantially reduces the hazard to the human body.

The fourth feature is that, unlike adamsite, tri-phenarsazine chloride, being insoluble in hydrocarbon, ketone, alcohol, ether, or other ordinary organic solvents, makes easy the preparation of paints.

The fifth feature is that it is economical when compared with those paints comprising purified adamsite. Adamsite, in order to be used in antifouling paints, must be purified. This is because the crude compound contains a high concentration of free HCl content which is harmful in manufacturing and applying such paints for the reasons noted previously herein. The purification is uneconomical. It requires repeated recrystallization with large amounts of solvents. However, tri-phenarsazine chloride, contained in the paint compositions of this invention is quite stable in water of low acidity and the excess HCl can be completely removed with water. This results in lower cost compared with that of those organic antifouling paints in which expensively refined adamsite is used.

The sixth feature is that the paint of this invention can be added to usual antifouling paints of cuprous and mercuric type with the result that the latter are remarkably enhanced in their antifouling properties. The antifouling effectiveness of tri-phenarsazine chloride used in the paint of this invention is recognized to be multiplied when combined with copper, mercury and other compounds, so that the amount of copper and mercury that has been necessary in conventional antifouling paint can also be reduced by the addition of a small amount of tri-phenarsazine chloride.

In view of the foregoing, it is apparent that the instant invention represents a method of using the compound tri-phenarsazine chloride as an essential element in antifouling paint compositions as well as the paint compositions containing the compound as an essential element.

The compositions of this invention comprise the common well known paint compositions in which has been dispersed an effective antifouling amount of tri-phenarsazine chloride. The paint compositions may generally be said to be composed of vehicles; pigments which contribute color, hardness and bulk; and solvents or thinners which control the consistency. Vehicles which may be employed are for example resins such as rosin, shellac, cellulose derivatives, rubber derivatives, acrylic resins, epoxy resins, amino resins, vinyl resins and bitumens; oleoresinous varnish such as made from a drying oil, polyhydric alcohol, and phthalic anhydride; tar varnish; pitch varnish; and other natural and synthetic varnishes and their emulsions. The pigments which may be employed are those which are commonly employed in the paint field, such as titanium dioxide. As solvents or thinners there also may be employed those which are commonly employed in the industry. The compositions also may contain driers which are commonly employed in the paint compositions.

The amount of the tri-phenarsazine chloride which may be employed in the compositions may vary over a considerable range depending upon the desired use of the composition and the degree of antifouling necessary to be obtained. In general it may be said that the amount will range from about 1 to about 50 percent by weight of the composition. When the tri-phenarsazine chloride is employed alone as the antifouling component of the composition it is preferable to employ an amount in the range of about 10 to about 35 percent by weight of the composition.

As previously stated the tri-phenarsazine chloride may be employed with additional antifouling components such as cuprous oxide, mercuric oxide, benzene hexachloride (BHC), and 1,1,1-trichloro-2,2-bis (p-chlorophenyl) ethane (DDT).

In order to illustrate the instant invention the following examples are presented. These examples are merely illustrative of the invention and are not to be construed as limitative thereof. Unless otherwise specified the amounts given are percent by weight based upon the total weight of the composition.

Paint compositions made up as set forth in the following examples are prepared by mixing and kneading the materials in a ball mill to obtain the desired degree of dispersion. These compositions are employed as hereinafter specified.

*Example I*

| | Percent by weight of the composition |
|---|---|
| Rosin | 24.0 |
| Oil soluble phenolic resin | 4.0 |
| Coal tar | 8.0 |
| Titanium dioxide | 13.0 |
| Talc | 15.0 |
| Tri-phenarsazine chloride | 10.0 |
| Solvent naphtha | 26.0 |
| Total | 100.0 |

*Example II*

| | |
|---|---|
| Rosin | 10.0 |
| Vinyl chloride resin (UCC: Vinylite Resin VYHH) | 7.0 |
| Tricresyl phosphate | 4.0 |
| Titanium dioxide | 10.0 |
| Tri-phenarsazine chloride | 35.0 |
| Aluminium stearate | 0.5 |
| Methyl isobutyl ketone | 16.5 |
| Xylene | 17.0 |
| Total | 100.0 |

*Example III*

| | |
|---|---|
| Rosin | 22.0 |
| Bodied linseed oil | 8.0 |
| Iron oxide | 15.0 |
| Cuprous oxide | 15.0 |
| Mercuric oxide | 2.0 |
| Tri-phenarsazine chloride | 1.0 |
| Calcium carbonate | 17.0 |
| Mineral spirit | 20.0 |
| Total | 100.0 |

*Example IV*

| | |
|---|---|
| Rosin | 18.0 |
| Asphalt | 2.0 |
| Coal tar | 6.0 |
| Iron oxide | 15.0 |
| Cuprous oxide | 20.0 |
| Tri-phenarsazine chloride | 3.0 |
| Baryte | 16.0 |
| Solvent naphtha | 20.0 |
| Total | 100.0 |

*Example V*

| | |
|---|---|
| Rosin | 10.0 |
| Vinyl chloride resin (UCC: Vinylite Resin VYHH) | 7.0 |
| Tricresyl phosphate | 4.0 |
| Titanium dioxide | 10.0 |
| Tri-phenarsazine chloride | 20.0 |
| BHC | 15.0 |
| Aluminium stearate | 0.5 |
| Methyl isobutyl ketone | 16.5 |
| Xylene | 17.0 |
| Total | 100.0 |

Example VI

| | |
|---|---|
| Rosin | 17.0 |
| Chlorinated rubber (Hercules Powder Co.: Parlon) | 3.0 |
| Methyl dihydro-abietate (Hercules Powder Co.: Hercolyn) | 17.0 |
| Titanium dioxide | 10.0 |
| Tri-phenarsazine chloride | 20.0 |
| Talc | 6.0 |
| Baryte | 4.0 |
| Aluminium stearate | 0.7 |
| Solvent naphtha | 22.3 |
| Total | 100.0 |

Example VII

| | |
|---|---|
| Rosin | 24.0 |
| Coal tar | 6.0 |
| Titanium dioxide | 15.0 |
| Talc | 5.0 |
| Tri-phenarsazine chloride | 5.0 |
| DDT | 10.0 |
| BHC | 10.0 |
| Solvent naphtha | 25.0 |
| Total | 100.0 |

The compositions after being dispersed to the desired degree to obtain an even dispersion, were applied to steel plates and aluminum alloy plates which had been coated with an anticorrosive primer. Immersion tests were carried out in Shimizu Port and Yokohama Port demonstrating the result that the paints thus prepared were able to prevent fouling due to barnacles, serpulae, ascidians, sea mussels, algae and other fouling organisms in the sea over a long period of time and that no acceleration of corrosion was observed on the aluminum alloy plates.

The samples, with the exception of those of Examples III and IV, were immersed for the three months of the summer in that part of Osaka Harbor where hydrogen sulfide pollution is always apparent. The results showed that no blackening was observed nor was there any deterioration of the film or lessening of the antifouling properties. In Examples III and IV, blackening was unavoidable because cuprous and mercuric compounds were used together with tri-phenarsazine chloride. These samples, however, displayed the excellent antifouling power which was multiplied as was mentioned above.

Another test was conducted in the River Uji, where the interior of the concrete raceway was coated with these samples. The results showed excellent prevention of the fouling by macronema or hydropsyche etc.

What is claimed is:

1. A paint composition suitable for application to metal, concrete, wood and other substrates which comprises organic vehicle, pigment and an effective amount of an antifouling compound of the formula

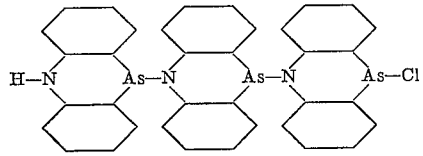

2. A paint composition suitable for application to metal, concrete, wood and other substrates which comprises organic vehicle, pigment and from about 1 to about 50 percent by weight of the composition a compound of the formula

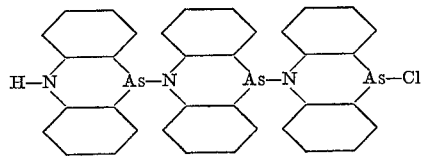

3. A paint composition suitable for use in coating metal, concrete, wood and other substrates which comprises organic vehicle, pigment and an antifouling compound of the formula

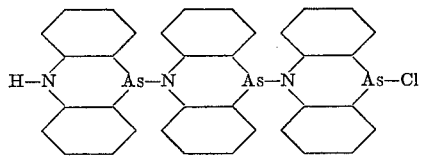

and at least one member selected from the class consisting of cuprous oxide, mercuric oxide, benzene hexachloride, and 1,1,1-trichloro-2,2-bis (p-chlorophenyl) ethane.

4. A method of preventing the fouling of metal, concrete, wood and other surfaces which comprises coating the said surfaces with a composition of claim 1.

5. A method of preventing the fouling of metal, concrete, wood and other surfaces being in contact with water which comprises coating the said surfaces with a composition of claim 1.

6. A method of preventing the fouling of metal, concrete, wood and other surfaces being in contact with sea water which comprises coating the said surfaces with a composition of claim 1.

7. In an antifouling paint composition comprising organic vehicle, pigment and at least one antifouling compound and suitable for application to metal, concrete, wood and other substrates, the improvement wherein an antifouling compound of the formula

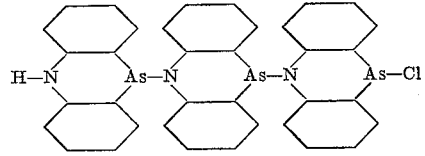

is present.

8. In an antifouling paint composition comprising organic vehicle, pigment and an antifouling compound and suitable for application to metal, concrete, wood and other substrates, the improvement wherein the antifouling compound is a compound of the formula

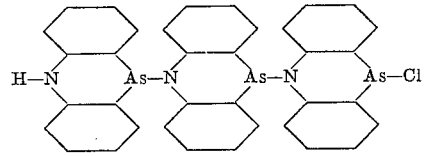

9. The improvement described in claim 8 wherein the antifouling compound is present in an amount ranging from about 1 to about 50 percent by weight of the composition.

References Cited

UNITED STATES PATENTS

| | | | |
|---|---|---|---|
| 3,041,188 | 6/1962 | Kageyama et al. | 106—15 |
| 3,079,414 | 2/1963 | Tamborski et al. | 260—45.75 XR |
| 3,228,830 | 1/1966 | McFadden et al. | 106—15 |

FOREIGN PATENTS

39/10,736    6/1964    Japan.

OTHER REFERENCES

Chemical Abstracts, 52, p. 10484A.
Chemical Abstracts, 54, p. 7056g.

ALEXANDER H. BRODMERKEL, *Primary Examiner.*

J. B. EVANS, *Assistant Examiner.*